(12) United States Patent
Deffenbaugh et al.

(10) Patent No.: US 7,433,785 B2
(45) Date of Patent: Oct. 7, 2008

(54) METHOD FOR PREDICTING GRAIN SIZE DISTRIBUTION FROM RESERVOIR THICKNESS

(75) Inventors: Max Deffenbaugh, Houston, TX (US); William B. Heard, Alexandria, VA (US); Chun Huh, Austin, TX (US); Tao Sun, Missouri City, TX (US); David C. Hoyal, Houston, TX (US)

(73) Assignee: Exxon Mobil Upstream Research Company, Houston, TX (US)

( * ) Notice: Subject to any disclaimer, the term of this patent is extended or adjusted under 35 U.S.C. 154(b) by 109 days.

(21) Appl. No.: 10/546,690

(22) PCT Filed: Feb. 20, 2004

(86) PCT No.: PCT/US2004/005019

§ 371 (c)(1),
(2), (4) Date: Aug. 22, 2005

(87) PCT Pub. No.: WO2004/083896

PCT Pub. Date: Sep. 30, 2004

(65) Prior Publication Data

US 2006/0173622 A1    Aug. 3, 2006

Related U.S. Application Data

(60) Provisional application No. 60/454,516, filed on Mar. 13, 2003.

(51) Int. Cl.
G05F 19/00 (2006.01)

(52) U.S. Cl. .................. 702/11; 702/2; 702/5; 702/6

(58) Field of Classification Search ............... 702/1, 702/2, 5, 6, 11, 14
See application file for complete search history.

(56) References Cited

U.S. PATENT DOCUMENTS 3,409,871 A * 11/1968 Heffring .............. 367/51

(Continued)

FOREIGN PATENT DOCUMENTS

JP    63-32345 A  *  2/1998

(Continued)

OTHER PUBLICATIONS

Dietrich, W. E. (1982) "Settling Velocity of Natural Particles," *Water Resources Research*, vol. 18, 1982, pp. 1615-1626.

(Continued)

Primary Examiner—Edward R Cosimano
(74) Attorney, Agent, or Firm—Matthew T. Shanley

(57) ABSTRACT

The present invention is a method for predicting the grain size distribution at a designated location within a water-lain sedimentary deposit. Initially, the vertical thickness of the sedimentary deposit at the designated location must be determined, as well as the vertical thickness and grain size distribution at a second location different from the designated location. Second, a distance parameter corresponding to the two locations must be determined. Finally the distance parameter is used, along with the initially determined vertical thickness at both locations and the grain size distribution at the second location to calculate the grain size distribution at the designated location.

22 Claims, 5 Drawing Sheets

U.S. PATENT DOCUMENTS

| | | | | |
|---|---|---|---|---|
| 3,418,625 | A | * | 12/1968 | Antsey .................. 367/40 |
| 4,291,271 | A | * | 9/1981 | Lauffer .................. 324/307 |
| 4,400,206 | A | * | 8/1983 | Kondo .................... 75/469 |
| 4,817,446 | A | * | 4/1989 | Kanamori ............... 73/865.5 |
| 5,282,384 | A | | 2/1994 | Holbrook ................ 73/152 |
| 5,859,367 | A | | 1/1999 | Holbrook ................ 73/152.05 |
| 6,473,696 | B1 | | 10/2002 | Onyia et al. ............ 702/6 |
| 6,674,689 | B2 | | 1/2004 | Dunn et al. |
| 6,823,266 | B2 | | 11/2004 | Czernuszenko et al. |
| 6,885,941 | B2 | * | 4/2005 | Deffenbaugh et al. ........ 702/2 |
| 7,024,021 | B2 | | 4/2006 | Dunn et al. |
| 7,062,383 | B2 | | 6/2006 | Deffenbaugh et al. |
| 7,369,980 | B2 | | 5/2008 | Deffenbaugh et al. |
| 2003/0144796 | A1 | | 7/2003 | Anstey et al. ............. 702/8 |
| 2004/0236511 | A1 | | 11/2004 | Deffenbaugh et al. |
| 2004/0260472 | A1 | * | 12/2004 | Deffenbaugh et al. ........ 702/2 |
| 2006/0173622 | A1 | * | 8/2006 | Deffenbaugh et al. ........ 702/2 |
| 2006/0265131 | A1 | * | 11/2006 | Deffenbaugh et al. ........ 702/14 |
| 2007/0100593 | A1 | | 5/2007 | Deffenbaugh et al. |
| 2007/0203677 | A1 | | 8/2007 | Awwiller et al. |
| 2007/0219724 | A1 | | 9/2007 | Li et al. |
| 2007/0219725 | A1 | | 9/2007 | Sun et al. |
| 2007/0288214 | A1 | * | 12/2007 | DeMartini et al. .......... 703/10 |

FOREIGN PATENT DOCUMENTS

| | | | |
|---|---|---|---|
| WO | WO 2004-083896 | A2 * | 9/2004 |
| WO | WO2006031383 | | 3/2006 |

OTHER PUBLICATIONS

Fournier, F., (1995) "A statistical methodology for deriving reservoir properties from seismic data," *Geophysics* vol. 60, pp. 1437-1450.

Garabedian, (1964) *Partial Differential Equations*.

Haldorsen, H. H. and Damsleth, E. (1990) "Stochastic Modeling," *J. Petroleum Technology*. April, pp. 404-412.

MacDonald, D. I. M. (1986) "Proximal to Distal Sedimentology Variation in a Linear Turbidite Trough: Implications for the Fan Model," *Sedimentology*, 33, pp. 243-259.

Middleton, G. V. and Neal, W. J. (1989) "Experiments on the Thickness of Beds Depositied by Turbidity Currents," *Jrnl. of Sedimentary Petrology*, 59, Mar. 1989, pp. 297-307.

Potter, P. E. and Scheidegger, A. E. (1965) "Bed Thickness and Grain Size: Graded Beds", *Sedimentology*, 7, Nov. 15, 1965, pp. 233.240.

Sadler, P. M. (1982) "Bed-thickness and grain size of turbidites," *Sedimentology* vol. 29, 1982, pp. 37-51.

Scheidegger, A. E. and Potter, P. E., (1964) "Textural Studies of Graded Bedding Observation and Theory," *Sedimentology*, 5, pp. 289-304.

Scheidegger, A. E. and Potter, P. E., (1971) "Downcurrent decline of grain size and thickness of single turbidite beds: A semi-quantitative analysis," *Sedimentology* vol. 17, pp. 41-49.

Syvitski, J. P. M., and Alcott, J. M., (1993) "Grain2: Predictions of particle size seaward of river mouths," *Computers & Geosciences*, vol. 19, 1993, pp. 399-446.

Talling, P. J. (2001) "On the Frequency Distribution of Tubidite Thickness," *Sedimentology*, 48, 2001, pp. 1297-1329.

PCT International Search Report, Nov. 18, 2004, 3 pages.

Garabedian, P. R. (1964) *Partial Differential Equations*, Chapter 2, pp. 18-23.

* cited by examiner

METHOD FOR PREDICTING GRAIN SIZE DISTRIBUTION FROM RESERVOIR THICKNESS

This application is a national stage entry under 35 U.S.C. 371 of PCT/US2004/005019 that published as WO 2004/083896 and was filed on Feb. 20, 2004 and claims the benefit of now expired U.S. Provisional application No. 60/454,516 which was filed on Mar. 13, 2003.

FIELD OF THE INVENTION

This invention relates generally to the field of geophysical prospecting and, more particularly, to seismic and sedimentary data interpretation. Specifically, the invention is a method for predicting the grain size distribution at any point within a water-lain sedimentary deposit based on the thickness of the deposit at that point and a measurement of grain size distribution and thickness at a single other point in the deposit.

BACKGROUND OF THE INVENTION

In the oil and gas industry, seismic prospecting techniques commonly are used to aid in the search for and evaluation of subterranean hydrocarbon deposits. A seismic prospecting operation consists of three separate stages: data acquisition, data processing, and data interpretation, and success of the operation depends on satisfactory completion of all three stages.

In the data acquisition stage, a seismic source is used to generate an acoustic impulse known as a "seismic signal" that propagates into the earth and is at least partially reflected by subsurface seismic reflectors (such as, interfaces between underground formations having different acoustic impedances). The reflected signals known as "seismic reflections") are detected and recorded by an array of seismic receivers located at or near the surface of the earth, in an overlying body of water, or at known depths in boreholes. The seismic energy recorded by each seismic receiver is known as a "seismic data trace."

During the data processing stage, the raw seismic data traces recorded in the data acquisition stage are refined and enhanced using a variety of procedures that depend on the nature of the geologic structure being investigated and on the characteristics of the raw data traces themselves. In general, the purpose of the data processing stage is to produce an image of the subsurface from the recorded seismic data for use during the data interpretation stage. The image is developed using theoretical and empirical models of the manner in which the seismic signals are transmitted into the earth, attenuated by subsurface strata, and reflected from geologic structures.

The purpose of the data interpretation stage is to determine information about the subsurface geology of the earth from the processed seismic data. The results of the data interpretation stage may be used to determine the general geologic structure of a subsurface region, or to locate potential hydrocarbon reservoirs, or to guide the development of an already discovered reservoir.

At present, results from the data interpretation stage are generally limited to the size and shape of large subsurface structures. The descriptions may, for example, provide an indication of the total volume of hydrocarbons which might be retained in such structures. However, seismic data does not provide direct information about the grain size distribution of reservoir sediments, such as sands. Nor does present technology allow the analyst to be able to determine preferred locations within a structure for drilling wells to efficiently produce the contained hydrocarbons, except in a very broad sense. When an exploration well has been drilled, grain size samples can be taken, but present technology does not allow an analyst to accurately characterize grain size in locations other than in the most immediate region of any such well.

As will be understood from this summary of the data interpretation stage of the seismic prospecting operation, it would be desirable to be able to predict the grain size distribution within a subsurface structure of interest using only seismic data and a minimal number of exploration wells, preferably just one exploration well. Such a capability would facilitate estimation of the hydrocarbon volume in place and potential production rates early in the hydrocarbon exploration and development process. As will be understood to those skilled in the art, hydrocarbon volumes and production rates depend on a variety of factors, including the grain size distribution of the sedimentary deposit that makes up the reservoir in which the hydrocarbons are found. The present invention is a method that may be used for predicting the grain size distribution at one or more locations including every location within a sedimentary deposit without having to drill multiple wells to obtain actual samples of the reservoir sediments.

SUMMARY OF THE INVENTION

The present invention is a method for predicting the grain size distribution at a designated location within a water-lain sedimentary deposit. Referring to the flow chart of FIG. 8, at step 81 the vertical thickness of the sedimentary deposit at the designated location is determined. At step 82, the vertical thickness and grain size distribution at a second location different from the designated location is determined. At step 83, a distance parameter corresponding to the two locations is determined. At step 84, the distance parameter is used, along with the initially determined vertical thicknesses and the grain size distribution, to calculate the grain size distribution at the designated location.

DETAILED DESCRIPTION

Figure 1:
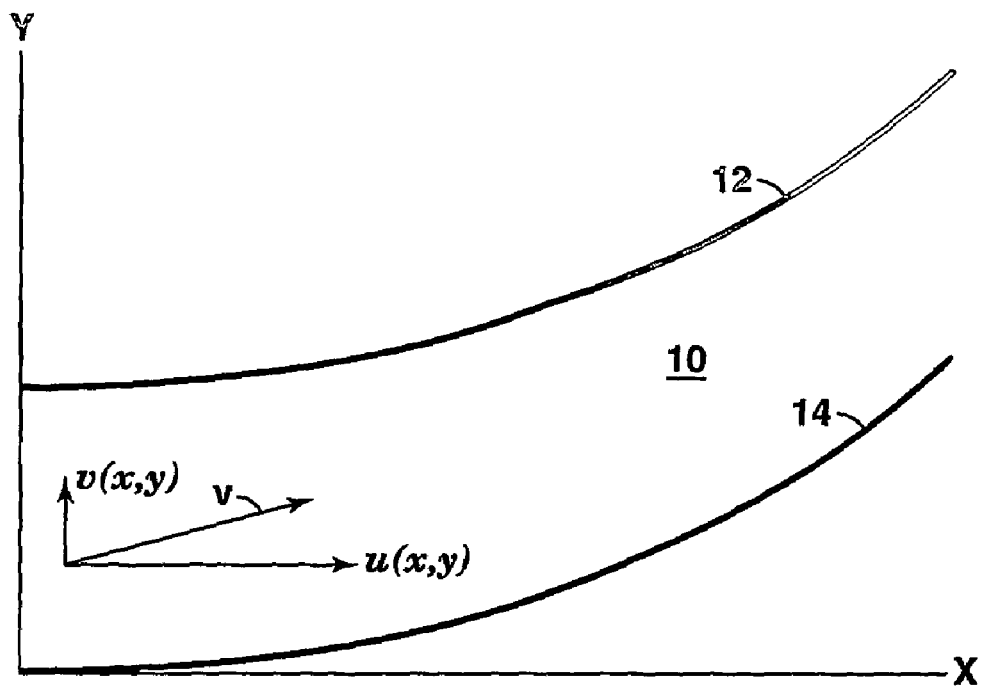
FIG. 1 depicts the plan view boundaries and the velocity components of a fluid flow which may create a deposit.

In the following detailed description, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather, the invention includes all alternatives, modifications, and equivalents falling within the true scope of the appended claims.

The present invention is a method that may be used for predicting the grain size distribution at one or more locations including every location within a sedimentary deposit using seismic data and without having to drill multiple wells to obtain actual samples of the reservoir sediments. Specifically, the inventive method can be applied to find the grain size distribution at any point within a water-lain sedimentary deposit, such as sand, based on the thickness of the deposit at that point and a measurement of grain size distribution and thickness at a single other point in the deposit. For example, the thickness of the deposit can be determined from seismic data or from an exploration well and the measurement of the grain size distribution can be determined from data from an exploration well.

The present invention improves on prior art technology in several important ways. First, the present invention relies on an explicit treatment of the physics of the sediment transport mechanisms that generate subsurface reservoir deposits. That explicit reliance on sediment transport physics decreases the need to rely on empirical correlations to specify deposit properties, an approach which has been heavily relied on in the prior art. (e.g., Fournier, F., "A statistical methodology for deriving reservoir properties from seismic data," *Geophysics* Vol. 60, 1995, pp. 1437-1450. Haldorsen, H. H. and E. Damsleth, "Stochastic Modeling." *J. Petroleum Technology*. April 1990, pp. 404-412.) Second, the present invention can be applied to both individual deposits and to the thickness and vertically-averaged grain size distributions of larger stratigraphic units. Prior art methods have generally not been extendable to larger stratigraphic units as a result of the multi-component nature of such units. (e.g., Scheidegger, A. E. and P. E. Potter, "Downcurrent decline of grain size and thickness of single turbidite beds: A semi-quantitative analysis." *Sedimentology* Vol. 17, 1971. pp. 41-49. Syvitski, J. P. M., and J. M. Alcott, "Grain2: Predictions of particle size seaward of river mouths." *Computers & Geosciences*, Vol. 19, 1993, pp. 399-446.) Third, the present invention may be used to predict a complete grain size distribution. Prior art approaches have generally been limited to prediction of a single parameter of the distribution, such as the median or the largest expected grain size (e.g., Sadler, P. M., "Bed-thickness and grain size of turbidites." *Sedimentology* Vol. 29, 1982, pp. 37-51.).

Introduction

Figure 2:
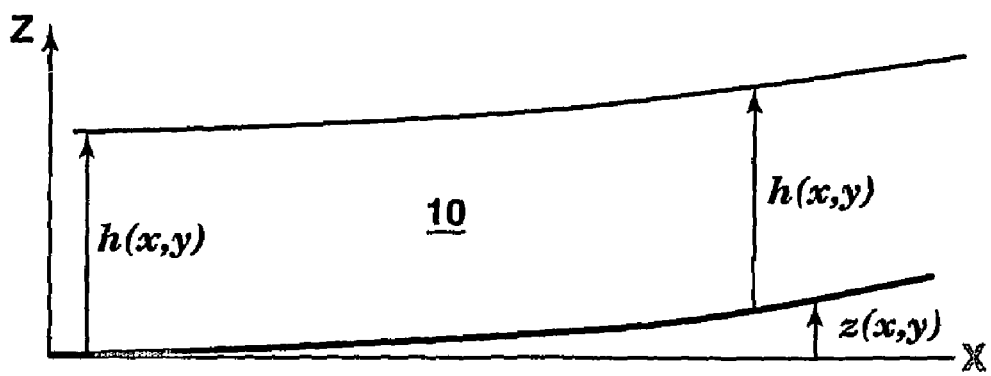
FIG. 2 depicts an elevation of the fluid flow of FIG. 1 and the elevation profile of the deposit that is created.

Table 1 and FIGS. 1 and 2 define certain parameters, which will assist in fully appreciating the present inventive method. The method is built on the assumption that the sediment, both in the flow and in the deposit, may be characterized by bins of a common nominal grain diameter. Each such bin may, for example, be characterized by a nominal diameter $d_i$, and include grains having an actual diameter with typical ranges from 84% to 119% of $d_i$. Other bin range definitions are within the scope of the present invention. The sediment grains are deposited from a sediment laden fluid flow immediately above the deposit, where that fluid flow has a height h(x,y) and a vector velocity V(x,y). The scalar components of the vector velocity V are u(x,y) and v(x,y). Velocity V(x,y) is assumed to be constant with depth within the fluid flow. The quantity of sediment in the fluid flow may be defined by a grain volume fraction $C_i(x,y)$ for each grain size bin. The grain volume fraction may be assumed to be constant with depth within the fluid flow.

FIG. 1 depicts a plan view of a fluid flow 10, with boundaries 12 and 14, in an (x,y) coordinate system. At any given point (x,y) within flow 10, vector velocity V will have scalar velocity components u(x,y) and v(x,y). As depicted in elevation view FIG. 2, the height of fluid flow 10 at any point is given by h(x,y), and the thickness of the deposit at any given point is given by z(x,y). Deposit thickness z(x,y) results from grains in fluid flow 10 depositing from fluid flow 10 over a time duration $T_0$.

TABLE 1

| | |
|---|---|
| Height of Fluid Flow | h(x, y) |
| Velocity (vector) of Fluid Flow | V(x, y) |
| Components (scalar) of Fluid Flow velocity vector | u(x, y), v(x, y) |
| Nominal Diameter of Sediment Grains of ith Grain Size bin | $d_i$ |
| Grain diameter threshold | $D_0$ |
| Volume Fraction of Grains of the ith Grain Size bin in the Fluid Flow. The sum of this term over all grain size bins gives the total fraction of the flow which is composed of sediment. | $C_i(x, y)$ |
| Thickness of Deposit resulting from deposition | z(x, y) |
| Grain Size Distribution in the deposit. Gives the fraction of total grain volume contained in the ith grain size bin. The sum of this term over all grain size bins is one. | $G_i(x, y)$ |
| Grain diameter at the Nth size percentile of the grain size distribution in the deposit at location x, y. | $p_N(x, y)$ |
| Still-water settling velocity of sediment grains of diameter $d_i$ | $w_s(d_i)$ |
| Effective Settling Velocity of Sediment Grains of diameter $d_i$ | $v_s(d_i)$ |
| Sediment Density (typically 2650 kg/m³) | $\rho_s$ |
| Fluid Density (typically 1000 kg/m³) | $\rho_w$ |
| Gravitational Constant (9.8 m/s²) | g |
| Viscosity Coefficient of Fluid (for water, typically 0.000881 Ns/m²) | μ |
| Time Duration over which deposition occurs to form deposit | $T_o$ |
| Dimensionless Particle Size | D* |
| Empirical Parameter of Fluid Flow | α |
| Location of the measurement point along a characteristic curve. | $s_0$ |
| Distance Parameter between the point of interest and the measurement point in characteristic curve coordinates. | $(s - s_0)$ |
| Empirical exponent used in scaling deposit thickness to compensate for entrainment. | β |
| Porosity of the deposit | φ |

Sediment Transport and Fluid Flow Physics

In an embodiment of the present invention, the behavior of a fluid flow, and the characteristics of the deposit that flow forms, are described by the following equations. It will be understood to those skilled in the art that the functional reference (x,y) for parameters which are functions of x and y has been omitted for convenience in the following, but that omission is not limiting on the discussion which follows or the method of the present invention.

Conservation of Flow Volume:

$$\frac{\partial hu}{\partial x} + \frac{\partial hv}{\partial y} = 0 \tag{1}$$

The terms hu and hv represent flow volume flux per unit length in the x and y directions, respectively. Equation (1) means that the flow volume flux into any region within the fluid flow is equal to the flow volume flux out of that region.

Conservation of Sediment:

$$\frac{\partial h u C_i}{\partial x} + \frac{\partial h v C_i}{\partial y} = -v_S(d_i) C_i \quad (2)$$

The term $v_s(d_i)$ is the effective settling velocity of grains of diameter $d_i$. The effective settling velocity is related to the actual settling velocity of grains in still water, but in addition contains correction factors which, for example, may adjust for the fact that the water is not still. The term $v_s(d_i)C_i$ therefore represents the rate at which the sediment volume of the ith grain size is settling out of the flow. As a result, equation (2) indicates that for each grain size volume fraction $C_i$, the sediment volume flowing into a region is equal to the sediment volume flowing out of that region plus the sediment volume that settles out of the flow within the region.

Deposit Thickness:

$$z(x, y) = \frac{T_0}{1-\phi} \sum_i v_S(d_i) C_i \quad (3)$$

Equation (3) simply states that the thickness z of the deposit at any x,y point may be determined by summing the settling rates for each grain size bin, multiplying by the time duration of the deposit, and dividing by the volume fraction of the deposit which is sediment (and not interstitial water), that is, dividing by one minus the porosity, $\phi$, of the deposit.

Settling Velocity for Grains of Sediment in Still Water:

The effective settling velocity relationship used in one embodiment of the present invention is based on the empirical still water settling velocity relationship of Dietrich, "Settling Velocity of Natural Particles," *Water Resources Research*, Vol. 18, 1982, pp. 1615-1626. Dietrich defines a "dimensionless particle size"

$$D_* = \frac{(\rho_S - \rho_W)\rho_W g d_i^3}{\mu^2} \quad (4)$$

and expresses the still water settling velocity $w_s$ as, $$w_S(d_i) = \begin{cases} \left[ g\mu(\rho_S - \rho_W) \frac{D_*^2}{5832} \right]^{1/3}, & D_* < 0.05 \\ \left[ g\mu(\rho_S - \rho_W) \exp\left( \begin{array}{c} a_0 + a_1 \log D_* + a_2 (\log D_*)^2 + \\ a_3 (\log D_*)^3 + a_4 (\log D_*)^4 \end{array} \right) \right]^{1/3}, & D_* \geq 0.05 \end{cases} \quad (5)$$

where, $\alpha_0 = -3.76715$, $\alpha_1 = 1.92944$, $\alpha_2 = -0.09815$, $\alpha_3 = -0.00575$, and $\alpha_4 = 0.00056$.

In one embodiment of the present invention, the effective settling velocity is defined as follows:

$$v_S(d_i) = \begin{cases} (d_i)^\alpha w_S(d_i) & d_i > D_0 \\ (D_0)^\alpha w_S(D_0) & d_i \leq D_0 \end{cases} \quad (6)$$

where the multiplicative factor of grain diameter to the power a is applied to Dietrich's settling velocity. In addition, a cutoff diameter $D_0$ is specified below which the effective settling velocity is considered constant. Note that other alternative forms of the functional dependencies of effective settling velocity on grain diameter may be employed within the scope of this invention.

In the effective settling velocity definition of equation (6), the power a is an empirical parameter specified based on the presumed nature of the fluid flow that resulted in deposition of the deposit of interest. Rare large fluid flows of high velocity (flood conditions) account for most of the sedimentary deposits which become part of reservoir formations. Such flows tend to be suspended load-dominated, and empirical studies indicate that a value of $\alpha=0$ is appropriate. On the other hand, more common fluid flows of modest velocity tend to be bed-load transport-dominated, and appear, from empirical studies, to have a settling velocity which has a much weaker dependence on grain diameter and a value of $\alpha=-1.5$ appears most appropriate.

Furthermore, empirical studies indicate that in deep water cases where the depositing flow persists a short time, grain size predictions are improved if a lower limit on the effective settling velocity is assumed. These studies suggest that a cutoff diameter, $D_0$, of 25 microns be used. It is believed that a significant volume of these smaller grains are suspended in a cloud above the main body of the flow and do not follow the same flow lines as the larger sediment fractions. The need for an effective settling velocity that does not change with grain diameter below a threshold diameter suggests that these smallest grain size fractions form a well-mixed cloud of sediment, where the size distribution does not change laterally. In cases where the flow persists long enough that the sediment deposited by the flow is much greater in volume at all points of interest than the sediment deposited by the suspended cloud, the cutoff diameter, $D_0$, should be 0 microns.

Based on these principles, one embodiment of the method of the present invention can be derived as follows. First, using the rule for the derivative of a product on equation (2) and simplifying the result using equation (1) gives:

$$hu \frac{\partial C_i}{\partial x} + hv \frac{\partial C_i}{\partial y} = -v_S(d_i) C_i \quad (7)$$

As will be understood to those skilled in the art, equation 7 is a linear partial differential equation of first order in $C_i$. In the second step, this equation may be solved by the method of characteristics, as more fully described by Garabedian, *Partial Differential Equations*, 1964. This solution involves the introduction of a variable s, which may be defined as a measure of distance along a characteristic curve of the fluid flow, as follows:

$$\frac{dx}{ds} = hu, \quad \frac{dy}{ds} = hv \quad (8)$$

Equation (8) allows equation (7) to be written as:

$$\frac{dC_i}{ds} = -v_S(d_i) C_i \quad (9)$$

The physical significance of equation (9) is that the rate of change of grain volume fraction along a characteristic curve is proportional to the rate at which the sediment volume is settling out of the flow. This relationship holds to the extent that deposition rate may be considered independent of flow velocity.

Note that the characteristic curves which result from introduction of the variable s will not necessarily be coincident with flowpaths of the fluid flow. Equation (8) involves the product of the height of the fluid flow, h, and scalar velocity components, u and v. As will be observed in FIG. 2, height h varies with location within the fluid flow, based for example on the height of the deposit z or flow velocity changes. These and other similar considerations are included in the flow volume flux terms on the right hand side of equation (8) and cause the characteristic curves s to not necessarily be identical to fluid flowpaths. Note that the use of characteristic curves in the present invention are for calculational convenience, but are not a limitation of the present invention.

Third, integrating equation (9) gives:

$$C_i(s) = C_i(s_0) \exp[-v_S(d_i)(s-s_0)] \quad (10)$$

Equation (10) means that the grain size volume fraction at a point s along a flowpath is related to the grain size volume fraction at an initial point $s_0$ multiplied by a decaying exponential term involving the effective settling velocity and the difference between sand $s_0$.

Fourth, combining this result with the deposit thickness relationship in equation (3) gives $$z(s) = \frac{T_0}{1-\phi} \sum_i v_S(d_i) C_i(s_0) \exp[-v_S(d_i)(s-s_0)] \quad (11)$$

Finally, it will be understood that, for a given location s, the grain size distribution $G_i(s)$ of grains in the deposit can be defined as:

$$G_i(s) = \frac{T_0 v_S(d_i) C_i(s)}{(1-\phi)z(s)} \quad (12)$$

DESCRIPTION OF EXAMPLE EMBODIMENTS

Figure 3:
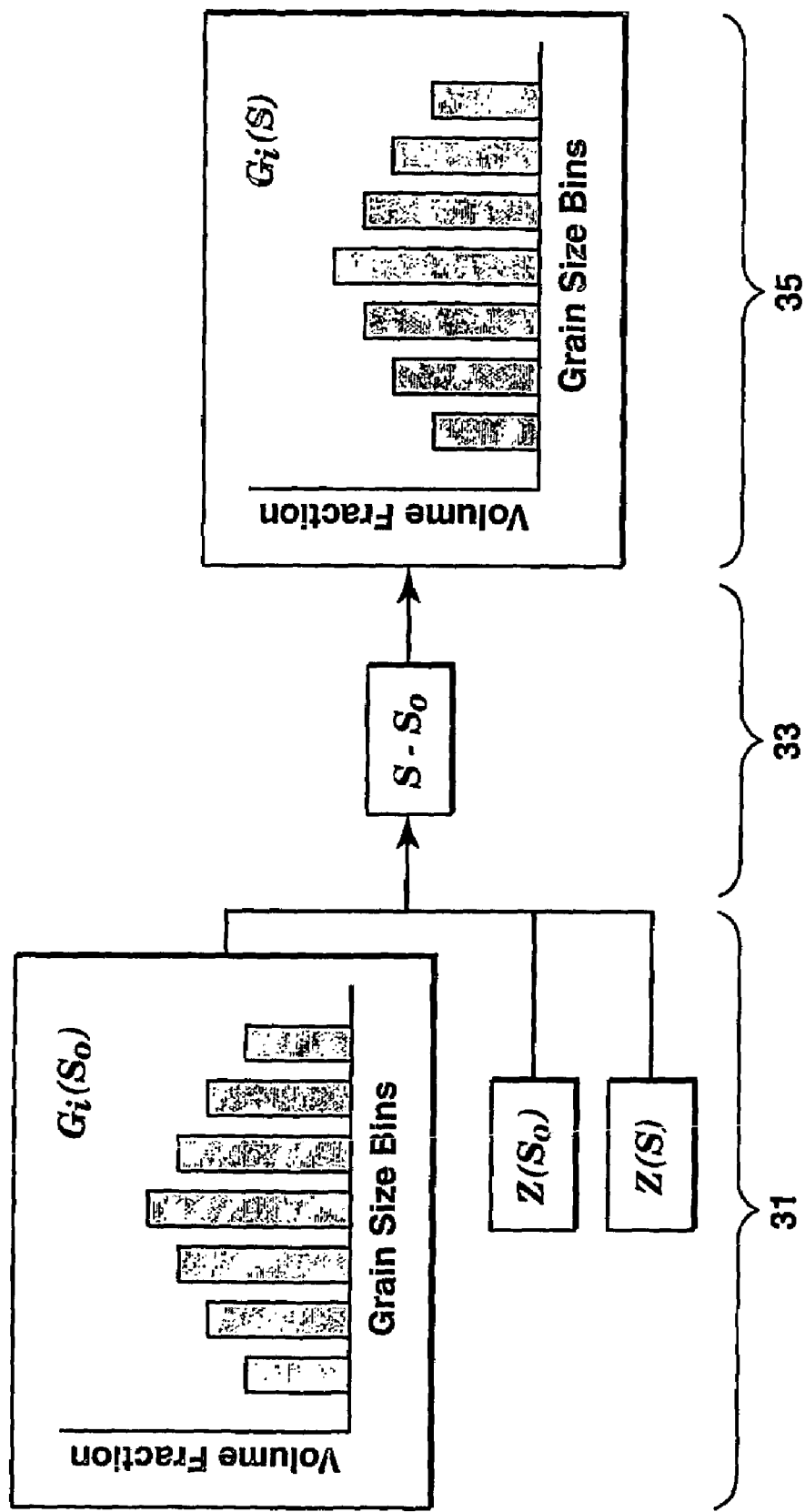
FIG. 3 depicts a flow chart of the calculation process for an embodiment of the method of the present invention.

This five step derivation allows a simple three step process, as depicted in FIG. 3, to be followed for predicting the grain size distribution at any location of interest in the deposit. First, the input parameters are specified, 31. This involves the determination or estimation of the thickness and grain size distribution at a single location in the deposit, for example from well data. For reference, this location, $s_0$, has a known deposit thickness $z(s_0)$ and deposit grain size distribution $G_i(s_0)$. In addition, the deposit thickness z(s) at the location, s, of interest must be specified, or estimated, for example from seismic data. Second, the distance parameter is computed, 33. The following equation is used to solve for the distance parameter $(s-s_0)$:

$$z(s) = z(s_0) \sum_i G_i(s_0) \exp[-v_S(d_i)(s-s_0)] \quad (13)$$

Equation (13) results from combining equation (12) and the known values of $z(s_0)$ and $G_i(s_0)$ with equation (11). Third, this result is used to determine $G_i(s)$, 35. In this example, $G_i(s)$ is determined from the following equation:

$$G_i(s) = \frac{z(s_0)}{z(s)} G_i(s_0) \exp[-v_S(d_i)(s-s_0)] \quad (14)$$

Equation 14 derives from substituting equation (10) into equation (12), and separately substituting the outcome of evaluating equation (12) at location $s_0$ into the resulting equation.

This three step analysis process allows the grain size distribution $G_i$ at every location s within the reservoir to be determined, solely on the basis of the three known or assumed input parameters: deposit thickness $z(s_0)$, grain size distribution $G_i(s_0)$, and deposit thickness z(s).

The assumptions embodied in equations 1, 2, and 3, along with the assumption that the effective settling velocity does not depend on the flow velocity, mean that each location within the deposit having a given thickness, referred to herein for convenience as Z*, will have a corresponding grain size distribution, referred to herein for convenience as G*. Furthermore, all locations within the deposit having the same thickness Z* will have the same grain size distribution G*. This thickness to grain size distribution relationship is the same along all characteristic curves (and hence over the entire area of the deposit), and is indexed by the single parameter $(s-s_0)$. As a result, equations (13) and (14) involve calculations which are independent of whether the location of interest falls on the same characteristic curve as does the reference location. It should further be understood that the "distance parameter" $(s-s_0)$ is an effective distance in the characteristic curve coordinate system and is not a physical distance between the reference location and the location of interest.

Noise in the measurement of grain size distribution and the physical approximations implicit in this method may limit the ability to extrapolate grain size distribution to locations where the thickness is several or more times larger or smaller than the measurement location. In such cases a modification of the method may be applied to achieve superior predictions. In this modification, grain diameters for at least one percentile of the grain size distribution (e.g., the "p50" grain diameter) are determined at the measurement location. The grain diameters for the same percentiles and an associated thickness are recalculated for a value of $s-s_0$ different from zero. The grain diameters corresponding to the same percentiles for any deposit thickness are then determined by a fitting a power law relationship to the grain diameters as a function of thickness at the measured location and the calculated location. For example, if the deposit thickness at the measurement location is $z(s_0)$ and the grain diameter of the Nth percentile of grain size is $p_N(s_0)$ at the measurement location, and the projected thickness for a value of s different from $s_0$ is z(s), and the grain diameter of the Nth percentile of grain size is $p_N(s)$, then the grain diameter at the Nth percentile of grain size at a different location s' with deposit thickness z(s') can be determined by fitting a power law relationship through the two grain diameter and thickness points. This is most easily accomplished by a linear extrapolation based on the logarithms of the diameters and thicknesses, according to equation 15, $$\log[p_N(s')] = \quad (15)$$

$$\log[p_N(s_0)] + \frac{\log[p_N(s)] - \log[p_N(s_0)]}{\log[z(s)] - \log[z(s_0)]} (\log[z(s')] - \log[z(s_0)]).$$

Turbidity currents in deep water entrain surrounding clear, stationary water. This entrainment modifies the relationship between thickness and grain size in the deposits of such currents. A simple modification to the inventive method compensates for the effect of entrainment, allowing the inventive method to be applied to deposits where entrainment is significant. To perform this modification, the measured deposit thickness z(s) at the designated location is first scaled to form z'(s) according to equation 16, $$z'(s) = z(s)\left[\frac{z(s)}{z(s_0)}\right]^\beta, \quad (16)$$

where $z(s_0)$ is the deposit thickness at the (second) location where the grain size distribution is measured. The exponent β has been determined empirically to be −0.3. The calculations of equations 13 and 14 are then applied as before, but using the scaled thickness z'(s) in place of the measured thickness z(s). Other choices of β are within the scope of this invention and may be used to partly compensate for other physical effects, such as the effect of flow velocity on the settling velocity of grains and the effect of porosity differences on measured thickness throughout the deposit. Other mathematical manipulations which achieve a similar adjustment to the predicted relationship between thickness and grain size distribution are also within the scope of this invention.

The inventive method can be applied to composite sand bodies, which are composed of many smaller sand bodies. In this case, the inventive method operates on the total thickness of the composite body and the averaged grain size distribution within the composite body at the specified plan-view points. In one embodiment, the grain size averaging is performed by summing the grain size distributions within each smaller sand body at a specified plan-view point, weighted by the fractions of the total thickness which each smaller body represents. Other methods for computing an average grain size distribution for a composite sand body are also within the scope of this invention.

In the inventive method, the predicted rate of change in grain size with thickness depends significantly on the sorting of the grain size distribution. Broader distributions generally result in predictions of more rapid changes in grain size with thickness. When the average grain size distribution of a composite sand body is calculated as the thickness-weighted average of the grain size distributions in the bodies which compose it, the average distribution tends to be broader than the distribution in most of the individual bodies. In this case, the inventive method would tend to predict too rapid a change of grain size with thickness, unless this effect is corrected by adjusting the effective settling velocity by choosing α<0, typically −1.5, in equation (6). In the alternative, the adjustment can be made by choosing a more negative value of β in equation (16).

Figure 4:
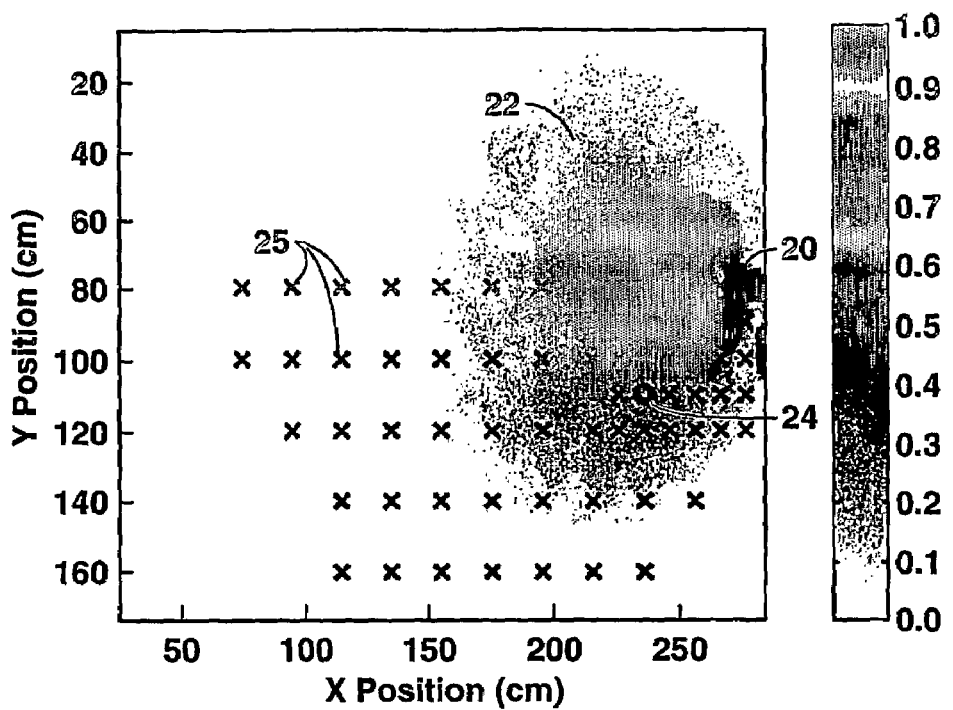
FIG. 4 depicts a plan view of a laboratory-generated deposit used in an example application of the method of the present invention.
Figure 5:
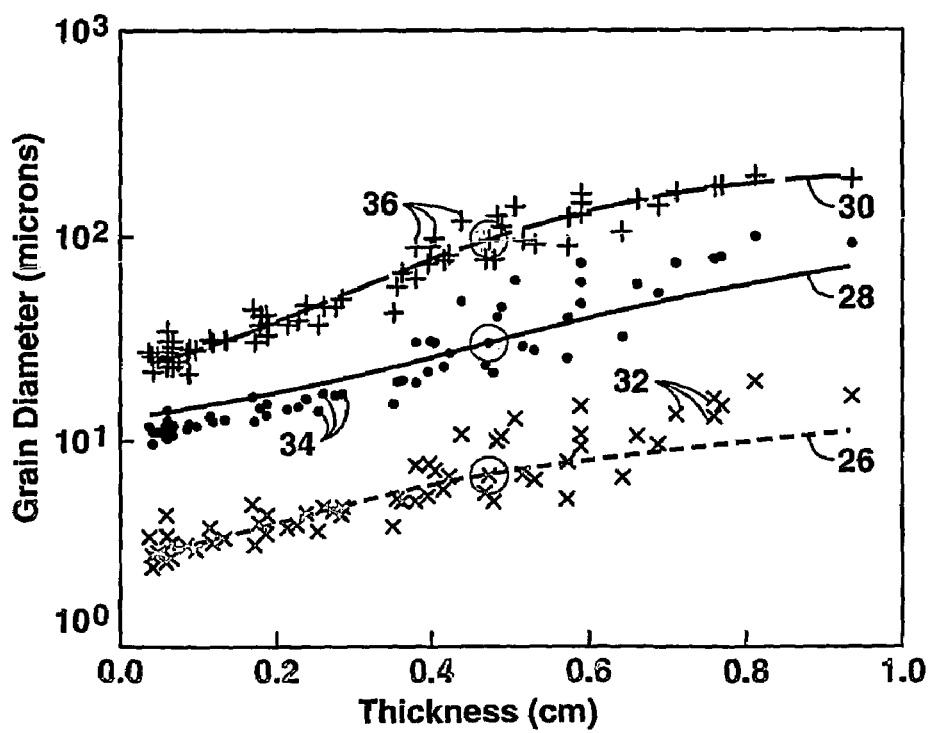
FIG. 5 compares measured with predicted results for the example of FIG. 4.

Typical Results:

FIGS. 4 and 5 depict the results of a first application of an embodiment of the present invention. FIG. 4 depicts results from a laboratory test in which sediment-carrying water was emitted at 16.5 cm/s with a 3.5% sediment concentration by volume from 2 inch diameter pipe 20 for five and a half minutes. Deposit 22 formed in front of the pipe. The thickness of the deposit is indicated by the relative shading of the image. Distance measurements in the x and y directions are in units of centimeters. A grain size distribution sample was taken at location 24 and used together with the measured deposit thickness at each of the locations 25 indicated with an X to predict the grain size distribution at those locations. In addition, actual grain size distributions were also measured at the locations 25 indicated by X's for comparison with the prediction. FIG. 5 shows the comparison of the measured to the predicted grain size distributions. FIG. 5 plots deposit thickness on the horizontal axis in units of centimeters against the grain diameter on the vertical axis in units of microns. Three examples of predicted grain diameters are shown, corresponding to the tenth percentile (P10) in the predicted grain size distribution, 26, the fiftieth percentile (P50), 28, and the ninetieth percentile (P90), 30, although it would be understood that the present invention predicts the entire grain size distribution G. These predictions are shown by the respective lines, with the measurements corresponding to each percentile shown by the corresponding symbols 32, 34, and 36, for the respective grain size distribution percentiles. The symbols 32, 25 34, and 36 with a grey-shaded border represent the measurement reference values used in the present method. In this example, the analysis assumptions included α=0, $D_0$=25 microns, and β=0. As can be observed, the measured values correspond well to the predictions resulting from an embodiment of the present invention.

Figure 6:
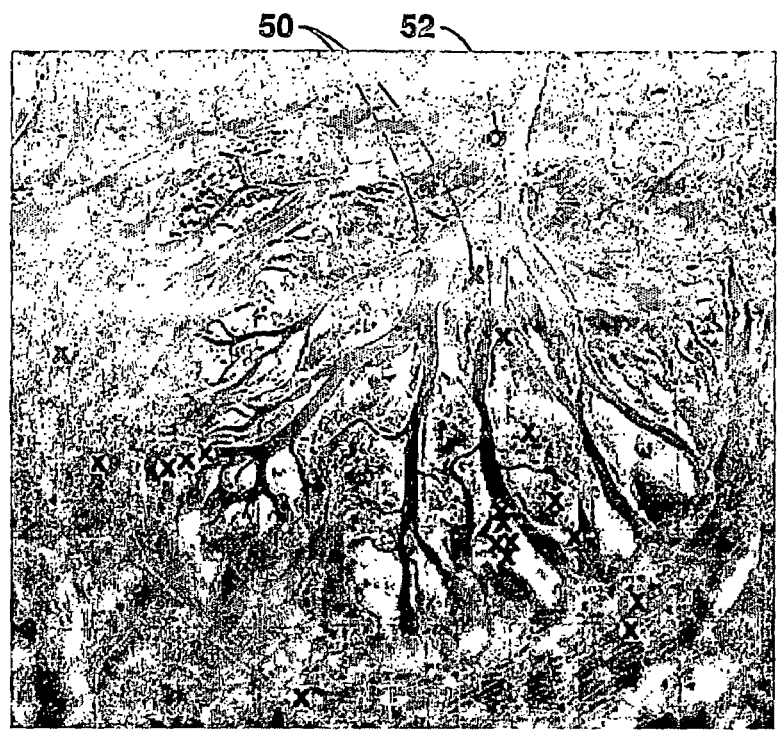
FIG. 6 depicts a plan view of the Wax Lake delta area in Louisiana.
Figure 7:
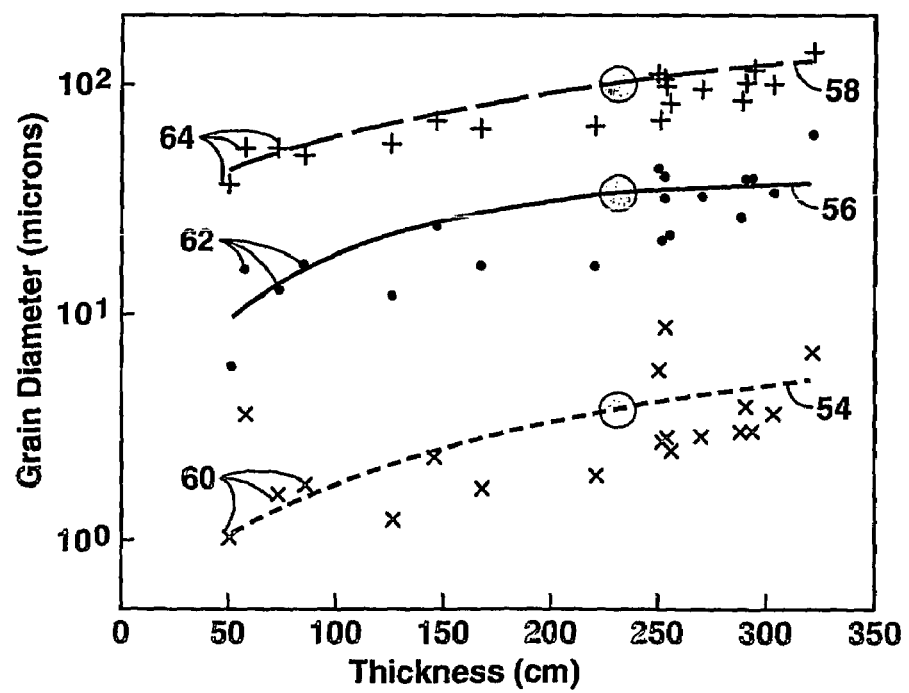
FIG. 7 compares measured with predicted results for the Wax Lake delta example of FIG. 6.
Figure 8:
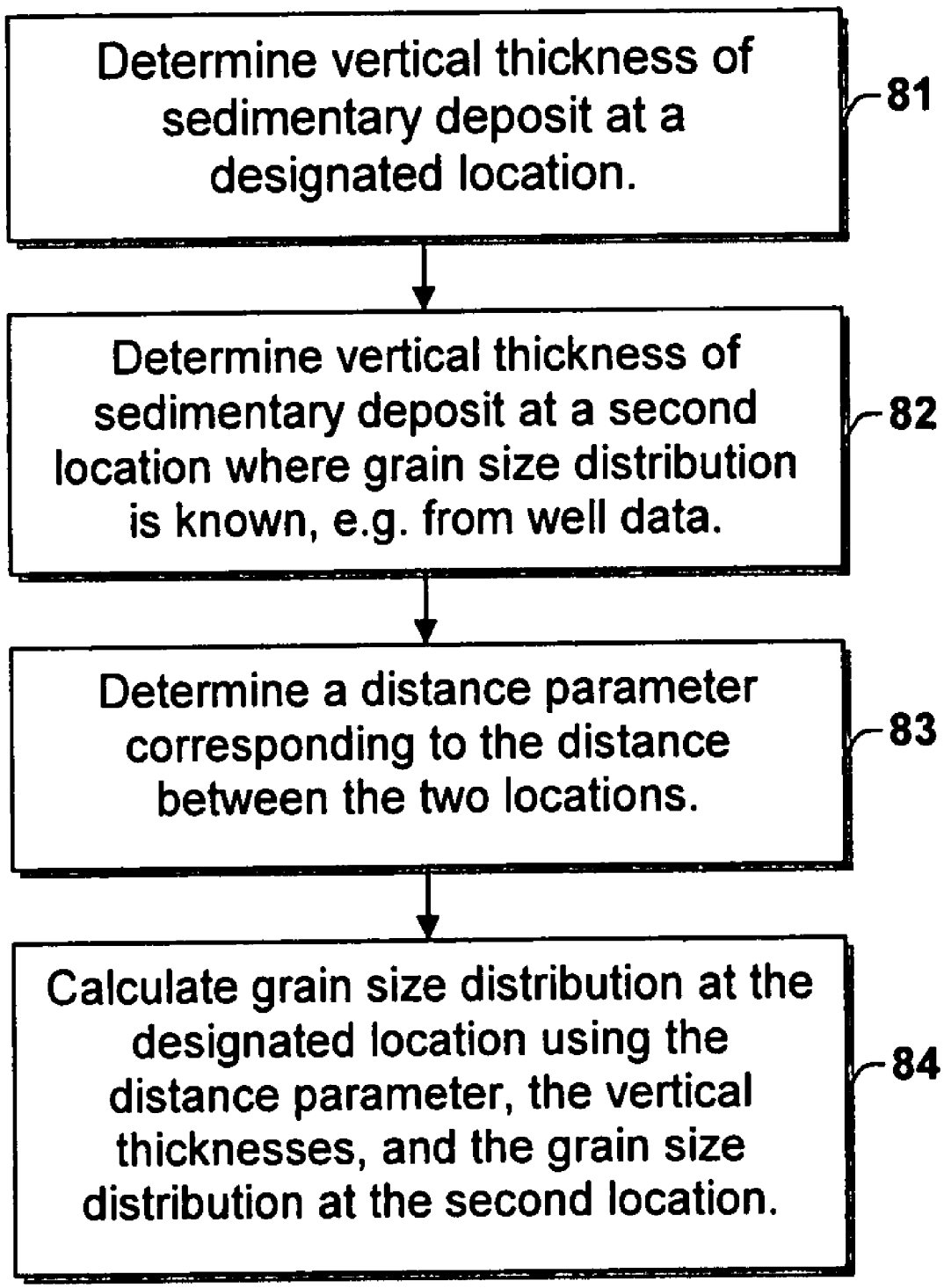
FIG. 8 is a flow chart showing basic steps in the present inventive method.

A second example of an application of an embodiment of the present invention is depicted in FIGS. 6 and 7. FIG. 6 shows an aerial view of the Wax Lake Delta in Southern Louisiana. X markings 50 on FIG. 6 indicate locations where core measurements were taken. The vertically averaged grain size distribution was calculated at each core location, and the thickness of the delta was also measured at the same locations. Data from core 52 was used as the reference point, and the average grain size distributions were predicted at core locations 50. FIG. 7 is similar in format to FIG. 5, with the P10, P50, and P90 grain diameters for the predicted distributions shown as lines, 54, 56, and 58 respectively, and the measured values shown as symbols, 60, 62, and 64. Symbols 60, 62, and 64 with a grey-shaded border are the measurement reference values corresponding to core 52 in FIG. 6. In this application α=1.5, $D_0$=0 microns, and β=0 were assumed. As with FIG. 5, the measurements show good agreement with the predictions from the embodiment of the present invention.

What is claimed is:

1. A method for predicting the grain size distribution at a designated location within a water-lain sedimentary deposit that is used to determine the general geologic structure of a subsurface region for hydrocarbon exploration or development, said method comprising:

(a) determining the vertical thickness of said sedimentary deposit at said designated location;

(b) determining the vertical thickness of said sedimentary deposit and the grain size distribution in said sedimentary deposit at a second location within said deposit;

(c) determining a distance parameter corresponding to said designated location and said second location;

(d) using said distance parameter, said vertical thicknesses at the designated location and at the second location, said grain size distribution at said second location, and a settling velocity of grains within a fluid flow from which said deposit was formed, to calculate said grain size distribution at said designated location based on physics of sediment transport mechanisms; and (e) using the calculated grain size distribution to determine the general geologic structure of a subsurface region for hydrocarbon exploration or development.

2. The method of claim 1 wherein said calculated grain size distribution is a function of the ratio of said thickness of said deposit at said second location to said thickness at said designated location.

3. The method of claim 1 wherein said calculated grain size distribution is proportional to said grain size distribution at said second location.

4. The method of claim 1 wherein said calculated grain size distribution is compared with a measurement of grain size at said designated location to determine whether said designated location is within the same sedimentary deposit as said second location.

5. The method of claim 1, wherein the grain size distribution in said sedimentary deposit at the second location is determined from samples taken when a well is drilled at said second location.

6. The method of claim 1, wherein the vertical thickness of said sedimentary deposit at said designated location is determined from seismic data.

7. The method of claim 1, wherein said distance parameter is distance between said designated location and said second location, measured along a characteristic curve of sedimentary deposit-forming fluid flow.

8. The method of claim 1 wherein said measured grain size distribution is the vertically averaged grain size distribution through a stratigraphic unit and said thickness at said designated location and said thickness at said second location are measured with respect to the top and bottom of the same stratigraphic unit, which may be comprised of one or more individual sedimentary deposits.

9. The method of claim 8 wherein said calculated grain size distribution is compared with a measurement of grain size at said designated location to determine whether said designated location is within the same stratigraphic unit as said second location.

10. The method of claim 1 applied with the designated location at every point within a sedimentary body such that the grain size distribution at every point within the sedimentary body is calculated.

11. The method of claim 10 where the grain size distribution calculated for every point in the sedimentary body is weighted by the thickness at the respective point and averaged to determine the source grain size distribution for the system.

12. The method of claim 1, further comprising extrapolating grain size distribution calculated at the designated location to at least one additional designated location within said deposit where vertical thickness can be determined.

13. The method of claim 12, wherein the extrapolation of grain size is based on a power law relationship between grain diameter at a given percentile of the grain size distribution and deposit thickness.

14. The method of claim 1, wherein the deposit thickness at said designated location is first multiplied by a scale factor.

15. The method of claim 14, wherein said scale factor is a power of the ratio of the deposit thickness at said designated location to the thickness at said second location.

16. The method of claim 1 wherein said distance parameter involves use of a characteristic curve parameter.

17. The method of claim 16 wherein said characteristic curve parameter is defined in relation to a flow volume flux parameter corresponding to the fluid flow from which said deposit was formed.

18. The method of claim 16 wherein said calculated grain size distribution is calculated from $$G_i(s) = \frac{z(s_0)}{z(s)} G_i(s_0) \exp[-v_S(d_i)(s-s_0)]$$

wherein:
$G_i(s)$ is the fraction of total grain volume at location s in the deposit contained in the ith grain size bin;
$G_i(s_0)$ is the fraction of total grain volume at location so in the deposit contained in the ith grain size bin;
$z(s_0)$ is the thickness of deposit at location $s_0$ where the grain size distribution was also measured;
$z(s)$ is thickness of deposit at location s where the grain size distribution is to be determined;
$v_s$ is the effective settling velocity of sediment grains as a function of grain diameter;
$d_i$ is the nominal diameter of the grains in the ith grain size bin;
$(s-s_0)$ is the distance parameter between the point of interest s and the second point $s_0$ where the grain size measurement is available.

19. The method of claim 1 wherein said calculation involves an exponential dependence on an effective settling velocity of grains within a fluid flow from which said deposit was formed.

20. The method of claim 19 wherein said effective settling velocity involves an empirical relationship to the nature of said deposit-forming fluid flow.

21. The method of claim 19 wherein said effective settling velocity is a function of grain size.

22. The method of claim 21 wherein said function of grain size involves a constant minimum diameter threshold.

* * * * *